May 7, 1957  J. PHILLIPS  2,791,441
MOTORCYCLE SUPPORTING STAND
Original Filed May 18, 1953
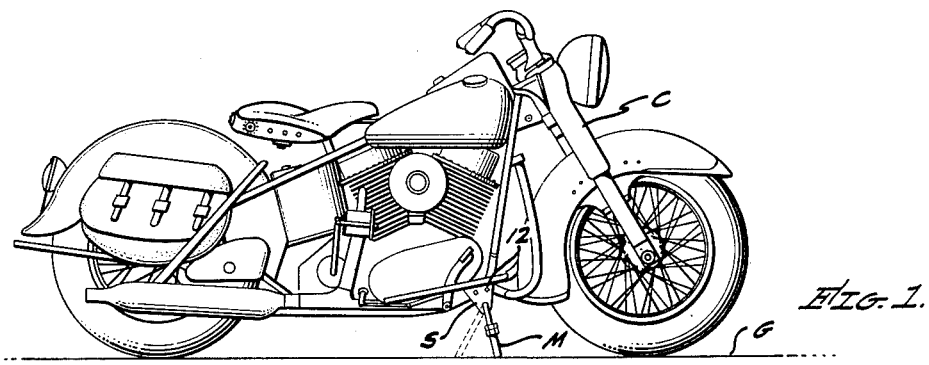
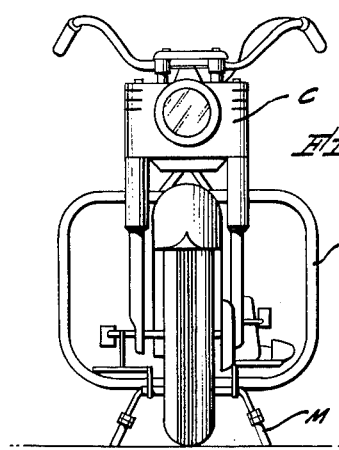
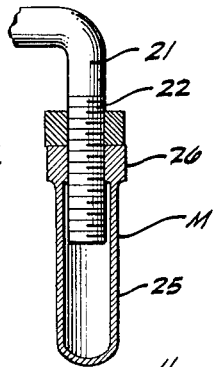
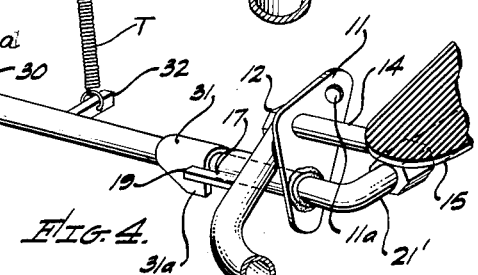
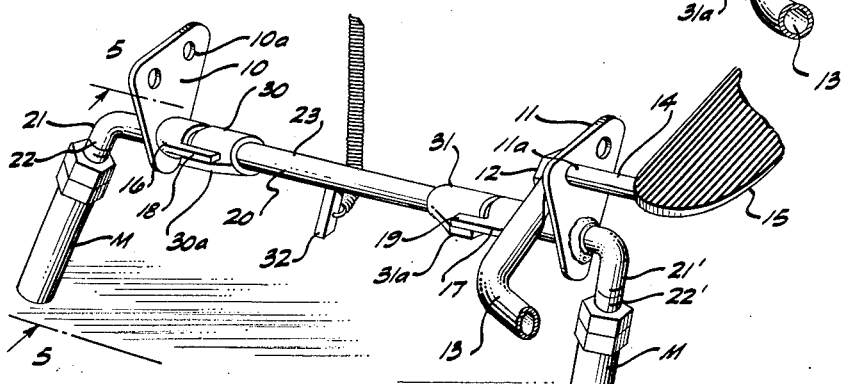
INVENTOR.
JAMES PHILLIPS,
BY
Sulwider, Mattingly and Babcock
ATTORNEYS

United States Patent Office 2,791,441
Patented May 7, 1957

2,791,441

MOTORCYCLE SUPPORTING STAND

James Phillips, Long Beach, Calif.

Continuation of application Serial No. 355,479, May 18, 1953. This application July 19, 1956, Serial No. 598,818

1 Claim. (Cl. 280—302)

The present invention relates generally to the field of motorcycles, and more particularly to a novel supporting stand for maintaining a motorcycle in an upright, stationary position. This application is a continuation of application Serial No. 355,479 entitled Cycle Supporting Stand filed in the United States Patent Office on May 18, 1953, now abandoned.

Although several types of motorcycle and bicycle supporting stands have been devised and marketed in the past, such heretofore-proposed stands each possess certain structural and operational disadvantages which preclude their wide acceptance. The chief disadvantages of the so heretofore-proposed stands are that they are clumsy and bulky in appearance; unduly complicated of mechanical structure; difficult to mount on a motorcycle or bicycle; and inconvenient to move to a non-supporting position.

The primary purpose of the present invention is to provide a supporting stand for motorcycles that not only eliminates the above-named disadvantages, but one that is also particularly adapted for use on a traffic officer's motorcycle to enable such motorcycle to be driven away from a stationary position with a fast getaway.

A major object of the present invention is to provide a motorcycle stand of simplified mechanical structure which may be readily installed on a conventional motorcycle.

Another object of the present invention is to supply a stand that may firmly support a motorcycle in a substantially vertical position when the motorcycle is at rest, and which will automatically move to a non-supporting retracted position when the motorcycle is placed in motion.

It is another object of the invention to provide a motorcycle supporting stand which is foolproof in operation.

A further object of the present invention is to furnish a motorcycle supporting stand that may be fabricated from readily obtainable, commercially available material, requires no elaborate plant facilities for its production, and one that may be retailed at a sufficiently low price as to encourage its widespread use.

These and other objects and advantages of my invention will become apparent from the following detailed description of a preferred form thereof, and from the drawing illustrating that form wherein:

Figure 1 is a side elevational view of a motorcycle equipped with a stand embodying my present invention.

Figure 2 is a front elevational view of said motorcycle showing it supported in a stationary vertical position by means of said stand;

Figure 3 is an enlarged perspective view of said stand disposed in a downwardly extending motorcycle-supporting position;

Figure 4 is an enlarged perspective view similar to Figure 3 but showing said stand disposed in a non-supporting position; and Figure 5 is a further enlarged fragmentary vertical cross-sectional view taken on the line 5—5 of Figure 3.

Referring now to the drawings for the general arrangement of my invention there is shown a motorcycle C provided with a stand S of generally inverted U-shape that includes two laterally separated supporting members M. The members M are pivotally supported on the motorcycle C, and when disposed in a forwardly and downwardly extending position shown in solid lines in Figures 1 and 2, maintain the vehicle in a substantially vertical position while it is at rest. A tension spring T associated with my invention tends to pivot the stand S from its downwardly extending position of Figures 1, 2 and 3 to a rearwardly directed, substantially horizontal position shown in Figure 4. The members M rotate on a fixed radius relative to the motorcycle C, and it will be apparent that the members cannot be pivoted from the motorcycle-supporting position shown in Figures 1, 2 and 3 to the non-supporting position shown in Figure 4 so long as the motorcycle remains at rest in a stationary position. However, upon the motorcycle C being moved forwardly into operation, the members M pivot rearwardly relative to the motorcycle so as to assume their retracted position shown in Figure 4. The rotation of the stand S from its motorcycle-supporting position to its non-supporting position is accomplished by the action of the spring S, as well as the frictional resistance of the lower ends of the members with the ground surface G in a manner to be fully set forth hereinafter.

The detailed mechanical structure of the stand S is shown in Figures 3, 4 and 5. It will be observed that the stand includes two substantially identical, laterally separated triangularly-shaped plates 10 and 11. Each of these plates is provided with bores 10a and 11a, which bores are adapted to be engaged by bolts 12. These bolts 12 rigidly connect the plates 10 and 11 to the guards 13 normally forming a part of the motorcycle C. In this regard and with particular reference to Figure 2, one of the bolts 12 may pass through a bore (not shown) in guard 13 to engage an internally tapped tubular member 14 forming a part of one of the motorcycle footrests 15. The plates 10 and 11 are each provided with sleeves 16 and 17, respectively, shown rigidly attached to the lower portions thereof, as by welding. The inwardly disposed portions of these sleeves include integral axially extending lugs 18 and 19, respectively.

The sleeves 16 and 17 serve to pivotally support a generally U-shaped base member 20 for rotation about an axis which is normal to the direction of travel of the motorcycle C. This base member 20 is preferably formed from steel and includes a pair of laterally spaced legs 21 and 21' having threads 22 and 22', respectively, formed thereon, and an intermediate element 23 which bridges the legs.

As shown in Figure 5, each of the supporting members M includes a rigid tubular shell 25 that is closed at its bottom end and a nut 26 welded or otherwise affixed to its upper open end thereof. The nut 26 is adapted to engage threads 22. Lock nuts 22a also engage threads 22 for restraining inadvertent rotation of the shell 25 relative to threads 22.

Forward movement of the members M beyond a predetermined point is prevented by means of two collars 30 and 31, that are rigidly affixed to the intermediate element 23 of the base member 20 adjacent sleeves 16 and 17. The collars 30 and 31 are formed with radially extending pads 30a and 31a which contact the undersides of the lugs 18 and 19 when the stand reaches the positions shown in Figures 1, 2 and 3. The collars are disposed inwardly of the sleeves whereby they limit sideward movement of the intermediate element.

The tension spring T is substantially vertically positioned, with its upper end affixed to the frame of the motorcycle C, and its lower end affixed to a centrally disposed tongue 32 integrally formed on the intermediate element 23 of the base member 20.

In operation, when the motorcycle C has been brought to rest, the stand S may be pivoted downwardly from its retracted position by one of the feet of the motorcyclist until the lower ends of the supporting members M contact the ground surface G, as shown in dotted line in Figure 1. A slight rearward movement is then imparted to motorcycle C, and the stand S will rotate within the sleeves 16 and 17 until the supporting members M occupy the position shown in solid line in Figure 1. Movement of the supporting members M beyond their forward position of Figure 1 is prevented by the engagement of the pads 30a and 31a with the undersides of the lugs 18 and 19, respectively.

The supporting members M will automatically return to their retracted position when the motorcycle C is moved forwardly off the stand S. In this regard, as the motorcycle C moves forwardly, the spring T will pivot the intermediate element 23 rearwardly until further pivotal movement is prevented by the engagement of the supporting members M with the undersides of the footrests 15. Thereafter these members M will be maintained in this substantially horizontal retracted position by the spring until such time as again brought to rest.

The motorcycle supporting stand shown and described herein is particularly adapted for use on a traffic officer's motorcycle. This is true inasmuch as the stand automatically retracts when the motorcycle starts moving ahead, hence no time is lost in manually retracting the stand. It will also be observed that the motorcycle is supported in an upright position whereby its motor is more easily cranked than is the case where it is supported in a leaning position.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claim.

I claim:

A quick-getaway stand for use in supporting a motorcycle in an upright position, from which position said motorcycle can be put in forward motion without attention to the position of said stand, that includes: two heavy rigid plates, each of which has a bore formed therein; means to removably affix said plates to opposite sides of the lower forward portion of said motorcycle; two inwardly extending sleeves affixed to said plates and aligned with said bores; two lugs supported by said sleeves and extending inwardly therefrom; a generally U-shaped member having a pair of laterally spaced legs and an intermediate element of circular transverse cross section connecting the upper end portions of said legs, which intermediate element is rotatably supported in said sleeves and said legs are disposed on the exterior of said plates, with threads being formed on the free end portions of said legs; two collars rigidly mounted on said intermediate element adjacent said sleeves; two pads supported by said collars that engage said lugs to prevent said legs from pivoting forwardly beyond downwardly and slightly forwardly extending positions; two tubular members having threads formed in the upper portions thereof that threadedly engage said threads on said legs, said tubular members being of such length as to contact the ground surface when said legs are in said downwardly and forwardly extending positions; a downwardly extending tongue supported from said intermediate element; and a tension spring extending between said tongue and a rearward portion of said motorcycle that immediately pivots said intermediate element and legs to a position where said legs extend rearwardly after said motorcycle has been moved forwardly to a position where said tubular members and legs are free from supporting said motorcycle.

No references cited.